(12) United States Patent
Abali et al.

(10) Patent No.: US 9,880,913 B2
(45) Date of Patent: Jan. 30, 2018

(54) STORING DATA IN MULTI-REGION STORAGE DEVICES

(71) Applicant: International Business Machines Corporation, Armonk, NY (US)

(72) Inventors: Bulent Abali, Tenafly, NJ (US); Mohammad Banikazemi, New York, NY (US); Timothy J. Chainer, Putnam Valley, NY (US); James L. Hafner; Dan E. Poff, Berkeley, CA (US); Krishnakumar Rao Surugucchi, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 14/968,285

(22) Filed: Dec. 14, 2015

(65) Prior Publication Data
US 2017/0168908 A1    Jun. 15, 2017

(51) Int. Cl.
*G06F 11/00* (2006.01)
*G06F 11/20* (2006.01)
*G06F 3/06* (2006.01)

(52) U.S. Cl.
CPC .......... *G06F 11/2069* (2013.01); *G06F 3/065* (2013.01); *G06F 3/0619* (2013.01); *G06F 3/0689* (2013.01); *G06F 2201/805* (2013.01)

(58) Field of Classification Search
CPC ............. G06F 11/2069; G06F 11/2084; G06F 3/0619; G06F 3/065; G06F 3/0689
See application file for complete search history.

(56) References Cited

U.S. PATENT DOCUMENTS

| 6,052,798 A | 4/2000 | Jeddeloh | |
| 6,493,160 B1* | 12/2002 | Schreck | G11B 20/1803 360/15 |
| 6,971,042 B2 | 11/2005 | Anderson | |
| 7,143,236 B2 | 11/2006 | Pomaranski et al. | |
| 7,190,537 B2* | 3/2007 | Jun | G06F 11/2084 360/15 |
| 8,977,804 B1* | 3/2015 | Horn | G06F 11/008 711/103 |
| 9,424,128 B2* | 8/2016 | Huang | G06F 11/106 |

(Continued)

OTHER PUBLICATIONS

M. Kaâniche et al., "A Hierarchical Approach for Dependability Analysis of a Commercial Cache-Based RAID Storage Architecture," Digest of Papers, 28th Annual International Symposium on Fault-Tolerant Computing, Jun. 1998, pp. 6-15, Munich, Germany.

*Primary Examiner* — Philip Guyton
(74) *Attorney, Agent, or Firm* — Daniel P. Morris; Ryan, Mason & Lewis, LLP

(57) ABSTRACT

An apparatus comprises a storage controller coupled to at least one multi-region storage device. The at least one multi-region storage device comprises two or more storage regions, the two or more storage regions comprising a first storage region associated with a first set of failure characteristics and at least a second storage region associated with a second set of failure characteristics different than the first set of failure characteristics. The storage controller is configured to replicate in the second storage region at least a portion of data that is stored in the first storage region.

20 Claims, 5 Drawing Sheets

(56) References Cited

U.S. PATENT DOCUMENTS

| | | | |
|---|---|---|---|
| 2002/0120812 A1* | 8/2002 | Ageishi | G06F 11/2058 |
| | | | 711/114 |
| 2002/0188800 A1* | 12/2002 | Tomaszewski | G06F 11/2084 |
| | | | 711/112 |
| 2003/0051110 A1* | 3/2003 | Gaspard | G06F 11/2084 |
| | | | 711/162 |
| 2005/0050410 A1 | 3/2005 | Pomaranski et al. | |
| 2005/0216657 A1* | 9/2005 | Forrer, Jr. | G06F 11/2084 |
| | | | 711/112 |
| 2006/0230231 A1 | 10/2006 | Barlow et al. | |
| 2006/0253730 A1* | 11/2006 | Manasse | G06F 11/1076 |
| | | | 714/6.2 |
| 2007/0136624 A1* | 6/2007 | Ejiri | G06F 11/2221 |
| | | | 714/710 |
| 2007/0294570 A1 | 12/2007 | Polisetti et al. | |
| 2007/0294598 A1* | 12/2007 | Anderson | G06F 11/2084 |
| | | | 714/54 |
| 2008/0126840 A1 | 5/2008 | Chen et al. | |
| 2010/0088459 A1* | 4/2010 | Arya | G06F 3/061 |
| | | | 711/103 |
| 2010/0205508 A1* | 8/2010 | Mesonzhnik | G06F 11/1048 |
| | | | 714/763 |

\* cited by examiner

FIG. 3
300

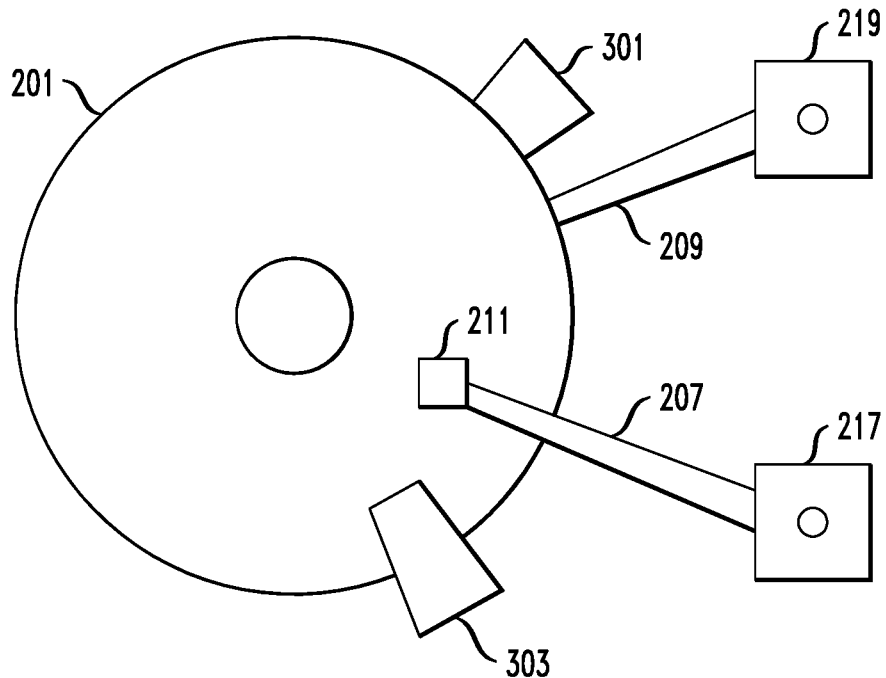

FIG. 4
400

402
DEFINE TWO OR MORE STORAGE REGIONS OF AT LEAST ONE MULTI-REGION STORAGE DEVICE, THE TWO OR MORE STORAGE REGIONS COMPRISING A FIRST STORAGE REGION ASSOCIATED WITH A FIRST SET OF FAILURE CHARACTERISTICS AND AT LEAST A SECOND STORAGE REGION ASSOCIATED WITH A SECOND SET OF FAILURE CHARACTERISTICS DIFFERENT THAN THE FIRST SET OF FAILURE CHARACTERISTICS

404
REPLICATE IN THE SECOND STORAGE REGION AT LEAST A PORTION OF DATA THAT IS STORED IN THE FIRST STORAGE REGION

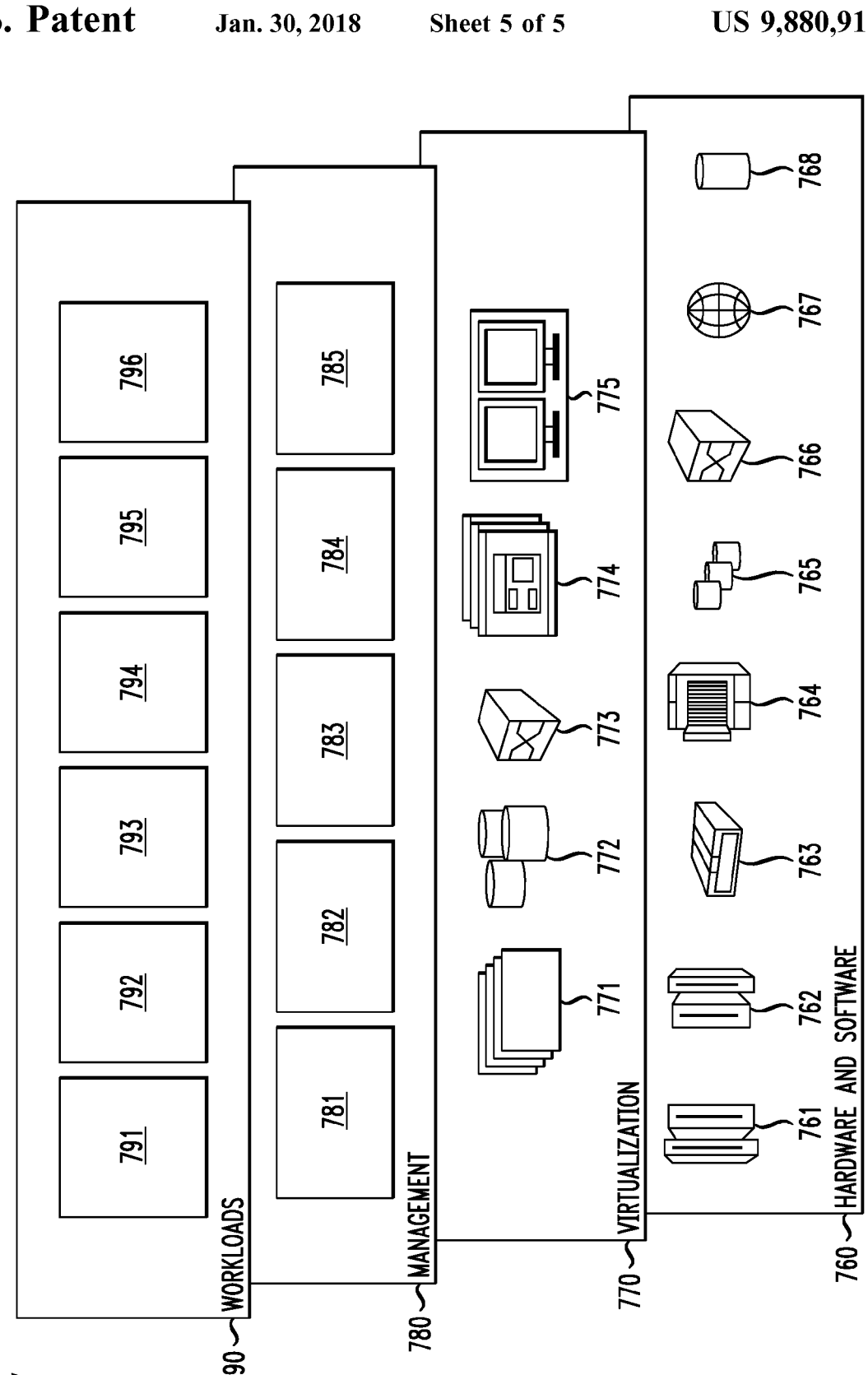

STORING DATA IN MULTI-REGION STORAGE DEVICES

BACKGROUND

The present invention relates to storage, and more specifically, to techniques for storing data. Storage devices, such as hard disk drives, continue to grow in storage capacity. In some cases, storage devices have significant capacity that goes unused. Such unused capacity, or empty disk space, typically serves no useful purpose in a computing system other than being available for future data storage.

SUMMARY

Embodiments of the invention provide techniques for storing data in a multi-region storage device.

For example, in one embodiment, an apparatus comprises a storage controller coupled to at least one multi-region storage device. The at least one multi-region storage device comprises two or more storage regions, the two or more storage regions comprising a first storage region associated with a first set of failure characteristics and at least a second storage region associated with a second set of failure characteristics different than the first set of failure characteristics. The storage controller is configured to replicate in the second storage region at least a portion of data that is stored in the first storage region.

BRIEF DESCRIPTION OF THE DRAWINGS

FIG. 3 depicts another view of the example multi-region storage device of FIG. 2, according to an embodiment of the present invention.

FIG. 4 depicts an example process for storing data in a multi-region storage device, according to an embodiment of the present invention.

FIG. 7 depicts abstraction model layers, according to an embodiment of the present invention.

DETAILED DESCRIPTION

Figure 1:
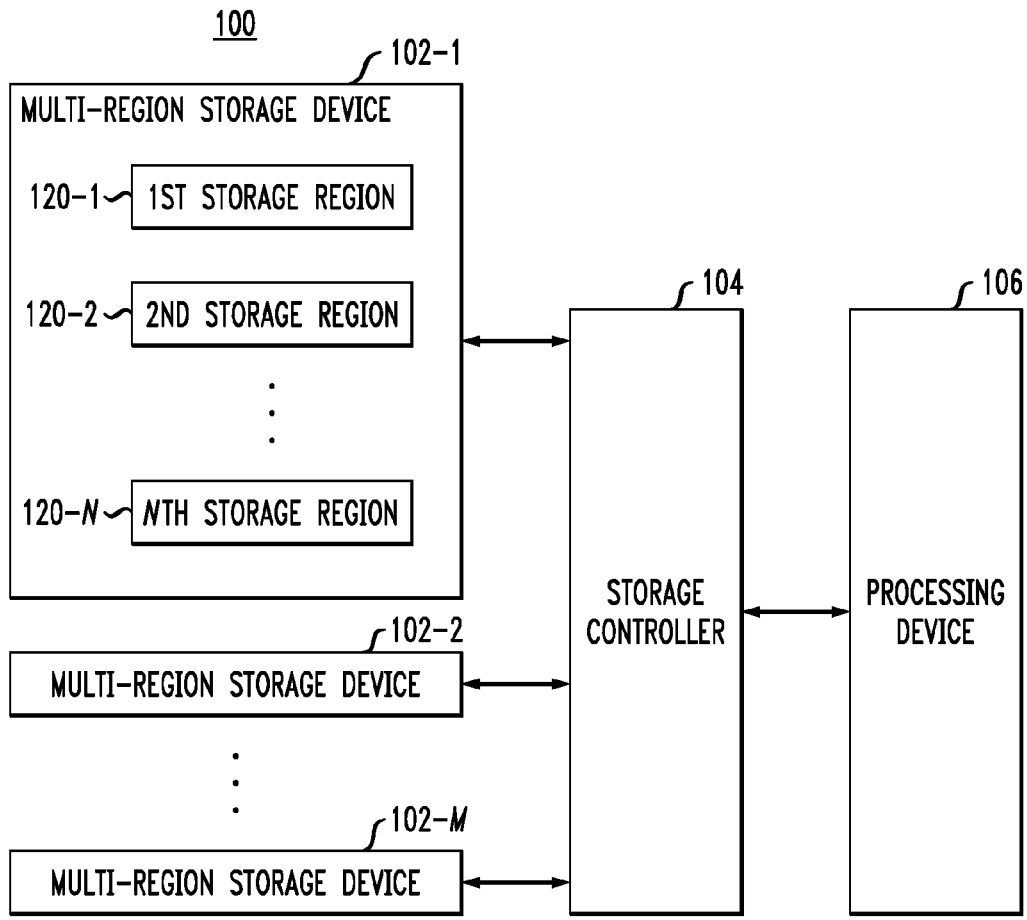
FIG. 1 depicts a system including a plurality of multi-region storage devices, according to an embodiment of the present invention.

Illustrative embodiments of the invention may be described herein in the context of illustrative methods, systems and devices for storing data in multi-region storage devices. However, it is to be understood that embodiments of the invention are not limited to the illustrative methods, systems and devices but instead are more broadly applicable to other suitable methods, systems and devices.

As discussed above, storage devices continue to grow in capacity such that in many cases, hard drives and other storage devices have significant unused storage capacity or empty disk space. For a typical user of a computing system including one or more storage devices, the storage devices are underutilized and recording heads, for example, spend significant time flying over blank media. This blank media serves no useful purpose other than its availability for future data storage.

A storage device, for example, may be a mechanical spinning disk drive (e.g., a hard disk drive (HDD)), a solid state drive (SSD), or a hybrid drive that combines HDD and SSD technology. A hybrid drive may be implemented in various ways. Generally, a hybrid drive combines the speed benefits of SSDs with the cost-effective storage capacity of HDDs. The SSD in a hybrid drive typically acts as a cache for data stored on the HDD, improving overall performance by keeping copies of most frequently used data on the SSD.

Hybrid drives may be implemented in various manners, including dual-drive hybrid systems and solid-state hybrid drives. In a dual-drive hybrid system, separate SSD and HDD devices are installed in a same computer, where data placement optimization is performed manually by an end user or automatically through the creation of a hybrid logical device. In solid-state hybrid drives, SSD and HDD functionalities are built into the same physical storage device by adding NAND flash memory to a HDD, where data placement decisions are performed by the device itself in a self-optimized mode or through placement hints supplied by an operating system in a host-hinted mode.

In some embodiments, blank media is used by a computing system to duplicate or mirror data written to a storage device. As an example, data that is recorded on a first surface of a disk platter in a HDD may be mirrored or duplicated on an unused second surface of the disk platter or on another disk platter. In this way, several copies of the user's data can be written to the disk providing increased robustness under a number of different system and device failure scenarios.

For example, in the case of a recording read and/or write head transducer failure, the data normally accessed using the failed recording head may be accessed on another surface of a HDD or other storage device that is accessed using a different recording head. As another example, data can be kept on opposing surfaces of a recording medium, such that a shock, due to dropping the device for instance, is less likely to damage both surfaces on which the data is stored. As a further example, if head disk interactions are detected on one recording head of a disk drive or other storage devices having multiple recording heads, the computing system can automatically switch to an alternative surface or region and recover the data. A user may be notified of the failure condition and given time to recover critical files. As another example, if bearing failures result in surface dependent track misregistration, the computing system can move to a best mechanical surface.

Various types of disk drives have built-in functionality for monitoring their operation, referred to as Self-Monitoring, Analysis and Reporting Technology (S.M.A.R.T.). Several examples of parameters in S.M.A.R.T. may indicate failure or pending failure of components which may lead to read or write errors. Such parameters differ based on the type of storage device.

In mechanical disk drives or HDDs, the following are examples of S.M.A.R.T. parameters indicating failure or pending failure of some portion of a HDD: ID 189 "High Fly Height" is a parameter that detects when a recording head is flying outside its normal operating range, which can indicate a defective air bearing surface of a recording head which can lead to write failures; ID 185 "Head Stability" is a parameter that detects when a recording head read signal is no longer stable, which can lead to read errors; ID 08 "Seek Time Performance" is a parameter that detects mechanical problems in the drive and may be recording head dependent, in a dual actuator arrangement this parameter may indicate failure of one of the recording head actuators; and ID 01 "Read Error Rate" is a parameter that detects when an individual recording head is experiencing errors while reading data.

SSDs may experience failures in particular memory cells. The following are examples of S.M.A.R.T. parameters indicating failure or pending failure of some portion of a SSD: ID 171 "SSD Program Fail Count" is an attribute that returns the total number of flash program operation failures since the drive was deployed; ID 172 "SSD Erase Fail Count" is an attribute that returns the total number of flash erase operation failures since the drive was deployed; and ID 173 "SSD Wear Leveling Count" is a parameter that counts the maximum worst erase count on any block.

It is to be appreciated that the specific S.M.A.R.T. parameters discussed above are presented by way of example only. Various other types of S.M.A.R.T. parameters may be utilized for detecting failure or potential failure of a storage device. In addition, various other types of failure conditions are possible and embodiments are not limited to the specific examples presented above.

While embodiments do not necessarily protect against all possible failure conditions for a storage device, the techniques described herein may be utilized to improve overall robustness of a storage or other computing system and can eliminate at least some failures. Further, embodiments can provide such improved overall robustness without adding any cost to the storage or other computing system.

Storage device reliability is an ongoing problem. Various techniques, such as vibration robustness and ruggedization, are utilized to increase the reliability of storage devices such as HDDs. The techniques described herein can be used to further increase the reliability of storage devices.

For some storage devices, such as disk drives, the granularity with respect to failure is smaller than the entire disk drive itself. Various current systems however, consider the granularity of a storage device at the disk drive level. In embodiments of the invention, a disk drive or other storage device is divided into multiple regions, forming what is referred to herein as a multi-region storage device (MRD). The regions of an MRD may be organized based on physical layout considerations, where the goal is to have an MRD wherein at least two of the regions are associated with different failure characteristics. Thus, disk accesses to a first region of an MRD may fail while access to a second region of the MRD can proceed without any problems.

Regions of an MRD with access failures may be referred to as failed regions. The failed regions may be discovered by a storage controller coupled to the MRD, or may be reported to the storage controller by the MRD itself, such as through a S.M.A.R.T. disk drive monitoring system. A computing system may use one or multiple MRDs for increasing system robustness.

FIG. 1 shows a computing system 100 including a set of MRDs 102-1, 102-2, . . . 102-M, collectively referred to herein as MRDs 102, coupled to a storage controller 104 and a processing device 106. The MRD 102-1, as shown in FIG. 1 includes multiple regions 120-1, 120-2, . . . 120-N, collectively referred to herein as storage regions 120. Each of the storage regions 120 may be associated with different sets of failure characteristics as will be discussed in further detail below. Although not explicitly shown in FIG. 1, other ones of the MRDs 102 may also comprise multiple storage regions associated with different sets of failure characteristics.

Storage controller 104 may be a disk controller providing an interface between the MRD 102 and the rest of computer system 100, including the processing device 106. The storage controller 104, in some embodiments, may further or alternatively be a disk array controller such as a Redundant Array of Independent Disks (RAID) controller. While FIG. 1 shows all of the MRDs 102 coupled to the same storage controller 104, in other embodiments different ones of the MRDs 102 may be coupled to different storage controllers and/or processing devices. In addition, in other embodiments a computing system may include only a single MRD such as MRD 102-1 rather than a set of two or more MRDs.

As discussed above, an MRD such as MRD 102-1 can be used to provide a higher level of protection against loss of data relative to a storage device not configured as an MRD. In some embodiments, the storage regions 120 of MRD 102-1, for example, may be divided into two or more different groups of storage regions. The division of the storage regions 120 into the two or more groups may be done such that certain partial disk failures like a malfunctioning recording head or disk surface affects only one group (or more generally less than all groups) of the storage regions 120.

A RAID-like implementation may be used on MRD 102-1 alone, where the different groups of storage regions 120 make up the storage volumes or logical units (LUNs) for the RAID array. Various types of RAID implementations may be utilized, including RAID1, RAID5, etc. In a system where the MRD 102-1 implements a RAID1-like implementation using two groups of the storage regions 120, any write to the MRD 102-1 results in two writes, one to each of the two groups of storage regions 120. The RAID arrangement may be implemented by the MRD 102-1 itself, or by software or hardware in the storage controller 104 and/or processing device 106.

Implementing a RAID-like implementation utilizing only a single MRD such as MRD 102-1 provides various benefits. For example, in a computing system having only a single disk drive, as is common in certain types of computing systems such as laptops and certain desktops, data can still be recovered when the MRD 102-1 partially fails. Many types of disk failures, such as recording head or disk head failures, can result in loss of access to parts of the disk while other parts of the disk can still be accessed normally. With the increasing size of individual disk drives, duplicating data on the disk is a reasonable approach considering the potential benefits. In a RAID1-like implementation, the MRD 102-1's useful size is reduced in half In other arrangements, however, the useful size of the MRD 102-1 need not be reduced by half. An example of such an arrangement is a RAID5-like implementation, which may reduce the useful size of the MRD 102-1 by as little as ⅓.

In other embodiments, the MRDs 102 such as MRD 102-1 need not utilize a RAID-like implementation. As one example, empty or unused storage space on MRD 102-1 may be utilized for copying portions of the data stored on the MRD 102-1. The mirroring or replication of data between respective ones of the storage regions 120 may be similarly chosen such that under a variety of partial disk failures data can still be recovered. Mirroring of data, and accessing mirror copies on partial disk failure, may be performed by the storage controller 104 or the processing device 106, possibly utilizing a block storage access hierarchy. Unused disk area can be used to provide higher robustness whenever possible.

Of course, in some arrangements the unused disk area may not be large enough to mirror all data stored on the MRD 102-1. In such cases, various algorithms may be used to prioritize which data is mirrored. In one algorithm, different types of data may be assigned different mirroring priorities. Consider, as an example, an arrangement wherein the MRD 102-1 is the primary hard drive for a user's laptop computer. Certain types of data, such as the user's documents, pictures, videos, etc. may be assigned a higher priority relative to application installation files or base operating system files as the application installation and operating system files may be recovered relatively easily by reinstalling the operating system or application while personal documents, pictures, videos, etc. may be difficult or impossible to replace.

In another algorithm, different ones of the storage regions 120 may be assigned different priorities based on their likelihood of failure. For example, storage region 120-1 may be determined to be twice as likely to fail as storage region 120-2. Thus, storage region 120-1 may be assigned a higher priority for mirroring relative to storage region 120-2.

In some embodiments, the data error rate for different types of stored data may be subject to differing requirements. As an example, a commercial movie video file may not require the same error rate as a personal video file or bank statement. Thus, in certain algorithms the type of data and error rate requirements may determine which data to mirror or replicate in a MRD. Various other algorithms may be used, including combinations of the above-described algorithms.

In some embodiments, two or more of the MRDs 102 may be used in a RAID-like arrangement. The storage controller 104 or processing device 106, acting as a RAID controller, may be suitably modified so as to use individual storage regions (or groups of storage regions) on two or more of the MRDs 102 as storage volumes or LUNs for a RAID array. As one example, the same number and same sized storage regions may be used from each of the MRDs 102. Consider an arrangement utilizing two MRDs, MRD 102-1 and MRD 102-1, having the same number of storage regions of the same sizes. For a RAID1 arrangement, normally each of MRD 102-1 and MRD 102-2 may be considered as a single storage volume or LUN in the RAID1 setup. In an embodiment, however, the storage regions of each of MRD 102-1 and MRD 102-2 may be divided into two groups. Then, a first group of storage regions from MRD 102-1 and a first group of storage regions from MRD 102-2 may collectively form a first storage volume or LUN for the RAID1-like arrangement, while a second group of storage regions from the MRD 102-1 and a second group of storage regions from MRD 102-2 may collectively form a second storage volume of LUN for the RAID1-like arrangement. For other types of RAID arrangements, including a RAID1-like arrangement utilizing storage regions from more than two of the MRDs 102, other arrangements of groups of storage regions may be used.

When a failed storage region is detected in a multiple MRD arrangement, the content of the failed storage region may be reconstructed in a newly added storage region if a suitable such storage region is available. For example, a RAID arrangement utilizing multiple MRDs need not initially utilize all the storage regions of all the MRDs. Instead, one or more storage regions on one or more of the MRDs may be saved for recovery of failed storage regions. Depending on the availability of free storage regions and the reliability requirements of a particular multiple MRD arrangement, the new storage region can be another storage region of a partially failed disk drive, a storage region on another MRD, or a storage region on a spare disk drive.

When a failure is detected in one of the storage regions, the storage controller 104 and/or processing device 106 may reconstruct sectors from the failed storage region first. Once the reconstruction is completed, heuristics may be utilized to mirror or replicate sectors from other storage regions that have not yet failed but which are determined as more probable to fail based on the heuristics.

The use of multiple MRDs for a RAID-like arrangement provides various benefits including reduced time of recovery and the recovery of the most vulnerable portions of disk drives first which can become more important as disk drive capacity grows. In RAID arrays, pre-failure replacement occurs when the array senses a future storage device failure and initiates a replacement. Post-failure replacement takes place after a storage device fails. The data on the failed storage device must be rebuilt from the parity data, which can take a considerable amount of time and impacts the availability of data stored on the RAID array. Thus, replicating data in MRDs can provide a path to pre-failure replacement greatly improving RAID availability.

The use of multiple MRDs can also lead to better utilization of disk drives. In addition, RAID arrays can be made from a larger variety of and numbers of disks as a single MRD need not be dedicated to only one RAID array. For example, the storage regions of a single MRD such as MRD 102-1 may be used in two different RAID-like arrays. Some of the storage regions 120 of MRD 102-1 may be used as part of a storage volume for a RAID1 array, while other ones of the storage regions 120 of MRD 102-1 may be used as part of a second storage volume for a RAID5 array. Various other arrangements are possible, including arrangements in which individual storage regions of a single MRD such as MRD 102-1 are used for two different RAID arrays of the same type, such as two different RAID or RAID5 arrays.

While various embodiments described above may be considered proactive, in that mirroring of data is performed prior to detecting failure in any storage region, embodiments are not limited to proactive mirroring. In other embodiments, mirroring may not be performed proactively but may instead be responsive to detecting failure in one or more storage regions of an MRD or responsive to predicting failure in one or more storage regions of an MRD. When a faulty storage region is detected, corrective actions may be taken. This may be done in hardware, such as storage controller 104 acting as a RAID controller, or in software such as a disk driver of the MRD 102 or in software implemented using one of or both of storage controller 104 and processing device 106.

Depending on the type of failure, or the prediction of failure, a decision is made as to whether there are other storage regions of a storage or other computing system that have higher probabilities of failure. In such cases, the content of those identified regions are copied into available storage regions with the lowest probability for suffering from the same type of failure.

For example, if a given storage region on a surface of a disk is identified as failed or predicted to fail, other storage regions containing neighboring surfaces may be marked as storage regions with a high probability of failure and the data on such storage regions may be moved, or mirrored, to another storage region or regions which use surfaces far from the failing surface. In some embodiments, this may be done by ranking all storage regions based on the detected failure and sorting the storage regions based on the ranking. A first available storage region with the lowest probability is selected as the destination storage region for moving data.

In some embodiments, there may exist two or more copies of a data segment. In cases where parts of data in a failed storage region are already available in one or more relatively safer storage regions, only those segments of the vulnerable storage region which are not already duplicated on a safer storage region need to be copied. The copy operations may be coordinated by the storage controller 104, a driver of the MRD itself, or in software at a higher level such as software implemented by processing device 106.

Once the vulnerable data is moved, the process of reconstructing the faulty region may begin. First, the MRD may be scanned to determine whether any portion or portions of the data in the faulty storage region are duplicated in other storage regions. In some embodiments, this may involve keeping a drive directory of where duplicated data is written. In such embodiments, scanning the drive may be replaced by simply table lookups in the drive directory which may be much faster than a scan of the MRD.

If any such portions are available in other storage regions, the data can be recovered using the duplicates. Otherwise, depending on the RAID level of the RAID array that the faulty region belongs to, the data in the faulty region may be recovered. For example, if the faulty region is part of a RAID1 array, the data in the faulty region may be reconstructed utilizing the mirror region. If the faulty region is part of a RAID5 array, the data in the faulty region may be reconstructed using other storage regions and parity sectors.

Figure 2:
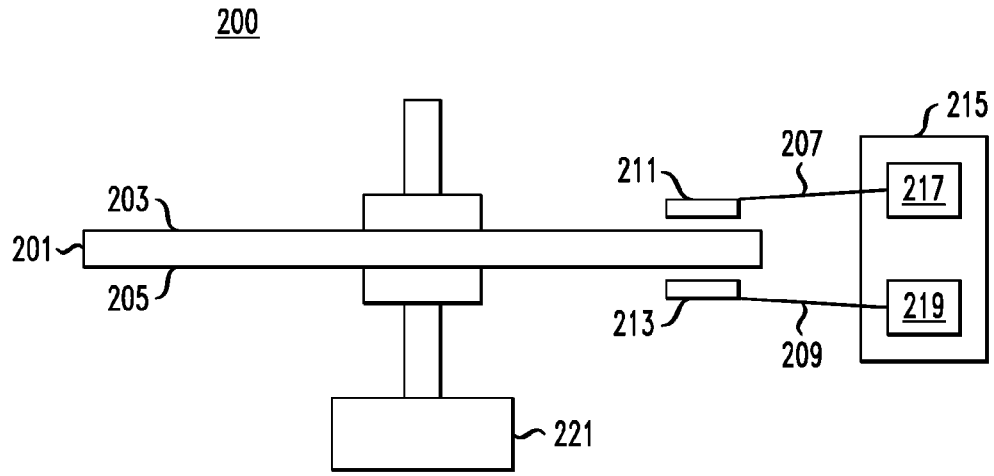
FIG. 2 depicts an example of a multi-region storage device, according to an embodiment of the present invention.

FIG. 2 shows an example of a HDD, which may be used as one of the MRDs 102 in the system 100. FIG. 2 is a side view 200 of portions of an MRD that includes one disk platter 201 with recording media on both sides, including an upper recording surface 203 and a lower recording surface 205. The disk drive in FIG. 2 includes an upper recording head actuator 207 and a lower recording head actuator 209, configured to control upper recording head 211 and lower recording head 213 for reading and/or writing data to the upper recording surface 203 and the lower recording surface 205, respectively. In some cases, upper recording head 211 and lower recording head 213 can be moved by a common actuator. A servo controller 215 has an upper recording head servo controller 217 and a lower recording head servo controller 219 for controlling the upper recording head actuator 207 and the lower recording head actuator 209, respectively. In some storage devices, a single actuator may be used to move all recording heads over large distances, where a secondary actuator or dual stage actuator is used for fine positioning of each individual recording head. Various other arrangements and combination of one or more multiple actuators are possible. The disk platter 201 is rotated by spindle motor 221. The upper recording head actuator 207 and the lower recording head actuator 209 share a common axis, but can move independently of each other. Although FIG. 2 shows a disk drive with only a single disk platter 201, other disk drives may include two or more disk platters. For a disk drive with two disk platters, there may be one or more actuators to move the recording heads for the disk platters.

The upper recording head 211 and lower recording head 213 may be positioned to radial locations on the upper recording surface 203 and lower recording surface 205 utilizing upper recording head actuator 207 and lower recording head actuator 209, respectively. Upper recording head servo controller 217 and lower recording head servo controller 219 control the upper recording head actuator 207 and lower recording head actuator 209, respectively. The upper recording head servo controller 217 and lower recording head servo controller 219 may receive commands from a storage controller such as storage controller 104 in response to requests from the processing device 106 to read or write data to the FIG. 2 disk drive.

In another configuration, as discussed briefly above, dual stage actuators (DSAs) may be utilized in a HDD. A primary voice coil motor (VCM) actuator is used to move all recording heads over large distances, with a secondary or DSA mounted close to the recording head used for independent fine positioning of each recording head. Multiple storage regions on each surface of the MRD may provide redundancy against failure of an individual recording head secondary actuator.

FIG. 3 shows a top view 300 of portions of the FIG. 2 disk drive, including an upper recording head ramp 301 and a lower recording head ramp 303 for positioning upper recording head 211 and lower recording head 213, which are independently controllable, into load/unload ramp positions.

The FIG. 2 disk drive may be configured as an MRD. For example, the upper recording surface 203 and lower recording surface 205 may be defined as first and second storage regions associated with different sets of failure characteristics. The upper recording surface 203 is associated with a first set of failure characteristics while the lower recording surface 205 is associated with a second set of failure characteristics. The differing failure characteristics may be due, at least in part, to the fact data is read from and written to the upper recording surface 203 utilizing upper recording head 211 while data is read from and written to the lower recording surface 205 utilizing lower recording head 213. In some embodiments, it may be unlikely for both the upper recording head 211 and the lower recording head 213, or for both the upper recording head actuator 207 and the lower recording head actuator 209 or upper recording head servo controller 217 and lower recording head servo controller 219, to fail at the same time. As an example, if due to a disk defect or a mechanical shock the upper recording head 207 flies too close to the upper recording surface 203 and damages a surface coating of the upper recording surface 203, it may be unlikely that the lower recording head 209 will simultaneously suffer a similar failure. Various other types of mechanical failure of the upper recording head 211, upper recording head actuator 207 and upper recording head servo controller 217 may be unlikely to occur at the same time as mechanical failure of the lower recording head 213, lower recording head actuator 209 and lower recording head servo controller 219.

The storage regions of the FIG. 2 disk drive need not be limited solely to distinctions between the upper recording surface 203 and the lower recording surface 205. In other embodiments, different portions of the upper recording surface 203 may be divided into two or more storage regions. For example, it may be determined that disk read or write errors tend to accumulate in particular sectors or clusters on the upper recording surface 203 or lower recording surface 205.

In addition, as discussed above in some embodiments an MRD may include multiple disk platters rather than a single disk platter as shown in the FIG. 2 disk drive. Each platter, or each surface of each platter, may be associated with different failure characteristics. Other types of MRDs may use other types of storage in addition to or as an alternative to disk-based storage. For example, a hybrid hard drive may include a disk drive and flash memory. The disk drive and flash memory of a hybrid hard drive may have different associated failure characteristics. Different regions within flash memory may also have different associated failure characteristics.

In some embodiments, the different storage regions of an MRD may be predefined, such as at the time of manufacture based on an analysis of the physical structure of the MRD, e.g., the different recording surfaces, recording heads and other hardware, etc. In other embodiments, the different storage regions of the MRD may be user-defined, or learned by a storage controller such as storage controller 104 or a processing device such as processing device 106 based on an analysis of failure patterns of the MRD. Heuristics may be used to identify correlated storage regions associated with similar failure characteristics. The failure patterns may be obtained by storage controller 104 from a S.M.A.R.T. monitoring system of an MRD such as MRD 102-1. In still other embodiments, a combination of predefined and user-defined storage regions may be used for a particular MRD such as MRD 102-1.

FIG. 4 shows a process 400 for storing data in at least one MRD. In step 402, two or more storage regions of at least one MRD are defined, where the two or more storage regions comprise a first storage region associated with a first set of failure characteristics and at least a second storage region associated with a second set of failure characteristics different than the first set of failure characteristics. Next, in step 404, at least a portion of the data that is stored in the first storage region is replicated in the second storage region.

In some embodiments, step 404 is performed responsive to detecting a failure in a third storage region of at least one MRD, where the third storage region has a third set of failure characteristics similar to the first set of failure characteristics. In other words, data replication or mirroring in step 404 may be performed for those storage regions that have similar failure characteristics to one or more failed storage regions.

Step 404 may be performed by a storage controller such as storage controller 104, and may in some embodiments further involve detecting a failure in the first storage region and reconstructing at least a portion of the data stored in the first storage region in a third storage region of the at least one MRD utilizing the replicated data stored in the second storage region.

The first and second sets of failure characteristics may comprise information indicating susceptibility to different types of failure. Different types of failure include mechanical failure of one or more parts of the at least one MRD, such as failure of one or more recording heads of the at least one MRD, degradation of a surface coating of a storage medium of the at least one MRD, etc.

In some embodiments, the at least one MRD referred to in the process 400 comprises a first MRD having a first plurality of storage regions associated with respective different sets of failure characteristics and a second MRD having a second plurality of storage regions associated with respective different sets of failure characteristics. The first storage region and the second storage region in the process 400 may both be part of the first MRD or may both be part of the second MRD. Alternatively, the first storage region may be part of one of the first MRD and the second MRD while the second storage region is part of the other one of the first MRD and the second MRD.

Provided below are various exemplary cases wherein the first storage region and the second storage region referred to in the process 400 are associated with different sets of failure characteristics. It is to be appreciated, however, that various other use cases are possible.

In one case, the first storage region comprises at least a portion of a first surface of a disk platter of the at least one MRD and the second storage region comprises at least a portion of a second surface of the disk platter of the at least one MRD.

In another use case, the first storage region comprises at least a portion of a first area of one or more disk platters of the at least one MRD accessed via a first recording head of the at least one MRD and the second storage region comprises at least a portion of a second area of the one or more disk platters of the at least one MRD accessed via a second recording head of the at least one MRD.

In another use case, the first storage region comprises at least a portion of a first disk platter of the at least one MRD and the second storage region comprises at least a portion of a second disk platter of the at least one MRD.

In another use case, the at least one MRD comprises a hybrid hard drive including a HDD and a flash memory or SSD where the first storage region comprises at least a portion of the HDD and the second storage region comprises at least a portion of the flash memory or SSD.

In another use case, there may be disk defects at particular azimuthal and radial (sector) locations on a disk drive which results in head disk interactions, such as a recording head making contact with a disk. A recording head servo control track following can be affected by errors in the servo pattern, which may occur at particular sector locations of a disk. Such servo pattern errors can occur at the time the servo pattern is written onto the disk during manufacture. In such instances, the first and second storage regions may thus comprise different azimuthal and radial locations, or more generally different sector locations of a disk.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
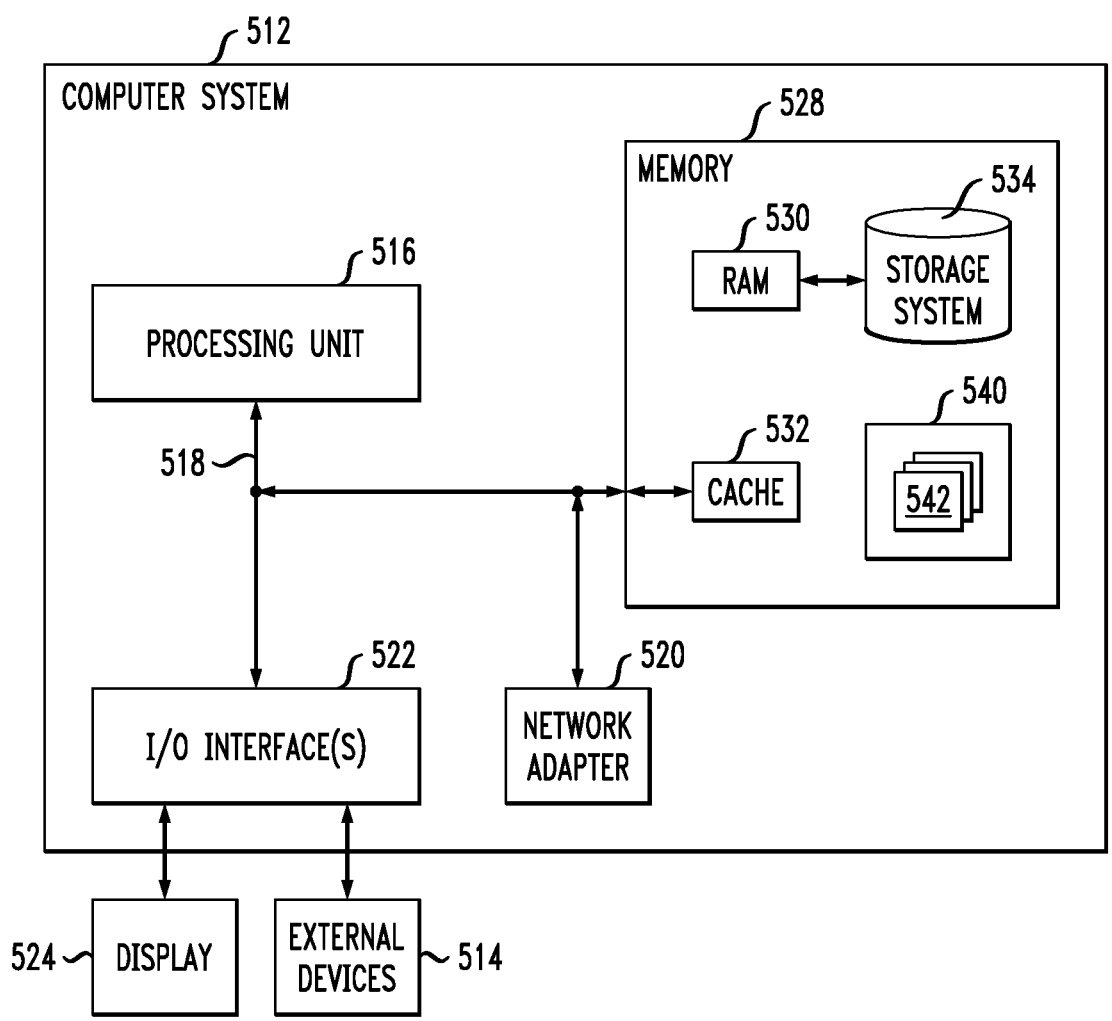
FIG. 5 depicts a computer system in accordance with which one or more components/steps of techniques of the invention may be implemented, according to an embodiment of the invention.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"), which is an example of an MRD. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via I/O interfaces 522. Still yet, computer system/server 512 can communicate with one or more networks such as a LAN, a general WAN, and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to, microcode, device drivers, redundant processing units, external disk drive arrays, RAID systems, tape drives, and data archival storage systems, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
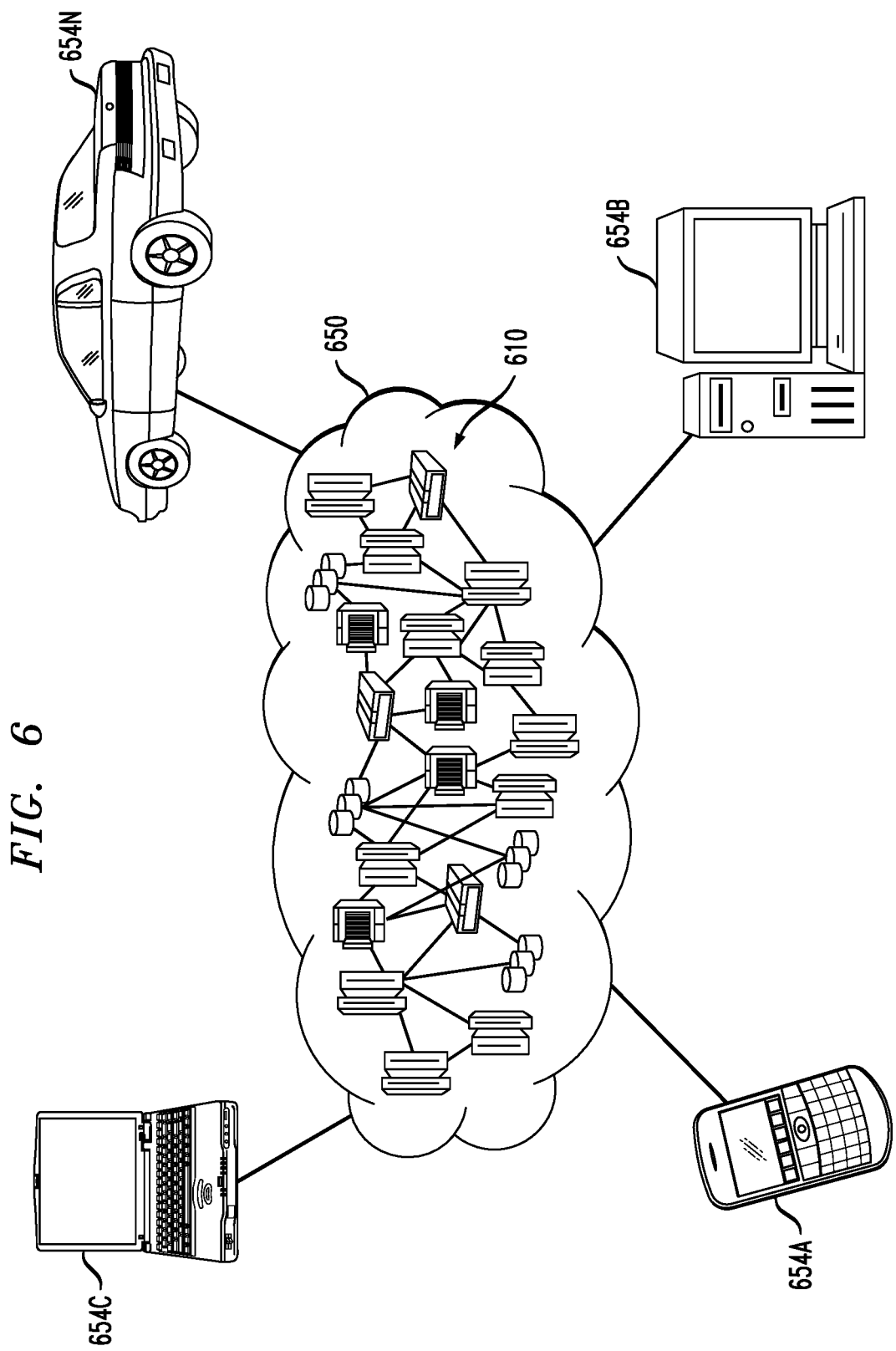
FIG. 6 depicts a cloud computing environment, according to an embodiment of the present invention.

Referring now to FIG. 6, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and data mirroring processing 796, which may perform one or more of the functions described above for defining MRDs, storing data on MRDs, reconstructing data in MRDs, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An apparatus comprising:
   a storage controller coupled to at least one multi-region storage device;
   wherein the at least one multi-region storage device comprises two or more storage regions, the two or more storage regions comprising a first storage region associated with a first set of failure characteristics and at least a second storage region associated with a second set of failure characteristics different than the first set of failure characteristics;
   wherein the storage controller is configured to replicate in the second storage region at least a portion of data that is stored in the first storage region; and
   wherein the storage controller is configured to replicate in the second storage region at least a portion of the data that is stored in the first storage region responsive to detecting a failure in a third storage region of the at least one multi-region storage device, the third storage region having a third set of failure characteristics similar to the first set of failure characteristics.

2. The apparatus of claim 1, wherein the two or more storage regions of the at least one multi-region storage device are predefined.

3. The apparatus of claim 1, wherein the two or more storage regions of the at least one multi-region storage device are defined by analyzing a physical structure of the multi-region storage device.

4. The apparatus of claim 1, wherein the two or more storage regions of the at least one multi-region storage device are defined by analyzing failure patterns of the multi-region storage device.

5. The apparatus of claim 4, wherein the failure patterns are obtained by the storage controller from a Self-Monitoring, Analysis and Reporting Technology (S.M.A.R.T.) monitoring system of the at least one multi-region storage drive.

6. The apparatus of claim 1, wherein the storage controller is further configured:
to detect a failure in the first storage region; and
to reconstruct at least a portion of the data stored in the first storage region in a fourth storage region of the at least one multi-region storage device utilizing the replicated data stored in the second storage region.

7. The apparatus of claim 1, wherein the first set of failure characteristics and the second set of failure characteristics comprise information indicating susceptibility to different types of failure.

8. The apparatus of claim 1, wherein the different types of failure comprise one or more of:
failure of one or more recording heads of the at least one multi-region storage device; and
degradation of a surface coating of a storage medium of the at least one multi-region storage device.

9. The apparatus of claim 1, wherein the storage controller is configured to utilize respective ones of the two or more storage regions as storage volumes in a redundant array of independent disks (RAID).

10. The apparatus of claim 1, wherein the at least one multi-region storage device comprises:
a first multi-region storage device having a first plurality of storage regions associated with respective different sets of failure characteristics; and
a second multi-region storage device having a second plurality of storage regions associated with respective different sets of failure characteristics.

11. The apparatus of claim 10, wherein the first storage region and the second storage region are both part of the first multi-region storage device.

12. The apparatus of claim 10, wherein the first storage region is part of the first multi-region storage device and the second storage region is part of the second multi-region storage device.

13. The apparatus of claim 1, wherein:
the first storage region comprises at least a portion of a first surface of a disk platter of the at least one multi-region storage device; and
the second storage region comprises at least a portion of a second surface of the disk platter of the at least one multi-region storage device.

14. The apparatus of claim 1, wherein:
the first storage region comprises at least a portion of a first area of one or more disk platters of the at least one multi-region storage device accessed via a first recording head of the at least one multi-region storage device; and
the second storage region comprises at least a portion of a second area of the one or more disk platters of the at least one multi-region storage device accessed via a second recording head of the at least one multi-region storage device.

15. The apparatus of claim 1, wherein:
the first storage region comprises at least a portion of a first disk platter of the at least one multi-region storage device; and
the second storage region comprises at least a portion of a second disk platter of the at least one multi-region storage device.

16. The apparatus of claim 1, wherein:
the at least one multi-region storage device comprises a hybrid hard drive comprising a hard disk drive and a flash memory;
the first storage region comprises at least a portion of the hard disk drive; and
the second storage region comprises at least a portion of the flash memory.

17. A computing system comprising at least one processing device coupled to the apparatus of claim 1.

18. A method comprising:
defining two or more storage regions of at least one multi-region storage device, the two or more storage regions comprising a first storage region associated with a first set of failure characteristics and at least a second storage region associated with a second set of failure characteristics different than the first set of failure characteristics; and
replicating in the second storage region at least a portion of data that is stored in the first storage region;
wherein replicating in the second storage region at least a portion of the data that is stored in the first storage region is responsive to detecting a failure in a third storage region of the at least one multi-region storage device, the third storage region having a third set of failure characteristics similar to the first set of failure characteristics.

19. A computer program product comprising a computer readable storage medium for storing computer readable program code which, when executed, causes a computer:
to define two or more storage regions of at least one multi-region storage device, the two or more storage regions comprising a first storage region associated with a first set of failure characteristics and at least a second storage region associated with a second set of failure characteristics different than the first set of failure characteristics; and
to replicate in the second storage region at least a portion of data that is stored in the first storage region;
wherein replicating in the second storage region at least a portion of the data that is stored in the first storage region is responsive to detecting a failure in a third storage region of the at least one multi-region storage device, the third storage region having a third set of failure characteristics similar to the first set of failure characteristics.

20. The method of claim 18, wherein the two or more storage regions of the at least one multi-region storage device are defined by analyzing failure patterns of the multi-region storage device.

* * * * *